US012711387B1

(12) United States Patent
Kochar et al.

(10) Patent No.: US 12,711,387 B1
(45) Date of Patent: Aug. 18, 2026

(54) UNSUPERVISED INTENT SEGMENTATION OF ANONYMOUS VISITORS USING MULTI-FACTOR INTERACTION ANALYSIS

(71) Applicant: Intuit Inc., Mountain View, CA (US)

(72) Inventors: Shaivi Kochar, San Jose, CA (US); Kevin Elkin, Sunnyvale, CA (US); Xiaowen Wang, Mountain View, CA (US); Cheuk Yu Tsang, Castro Valley, CA (US); Subramanian Chandrashekarapuram, San Jose, CA (US)

(73) Assignee: Intuit Inc., Mountain View, CA (US)

( * ) Notice: Subject to any disclaimer, the term of this patent is extended or adjusted under 35 U.S.C. 154(b) by 0 days.

(21) Appl. No.: 19/373,490

(22) Filed: Oct. 29, 2025

(51) Int. Cl.
*G06N 3/04* (2023.01)
*G06F 18/23* (2023.01)
*G06N 3/084* (2023.01)
*G06N 3/098* (2023.01)

(52) U.S. Cl.
CPC ............. *G06N 3/084* (2013.01); *G06F 18/23* (2023.01)

(58) Field of Classification Search
CPC ................................ G06N 3/084; G06F 18/23
See application file for complete search history.

(56) References Cited

U.S. PATENT DOCUMENTS 8,295,597 B1 * 10/2012 Sharma .................. G06V 20/41 382/173
2015/0303052 A1 * 10/2015 Brar .................. H01L 21/67051 29/559
2018/0344215 A1 * 12/2018 Ohnemus .............. A61B 5/1118
2020/0104775 A1 * 4/2020 Chintalapati .......... G06Q 10/04
2022/0188698 A1 * 6/2022 Halecky ............. G06Q 30/0613
2023/0232052 A1 * 7/2023 Khavronin ........... H04N 21/251 709/219

OTHER PUBLICATIONS

Liu, Y, et al., "End-to-End Learnable Clustering for Intent Learning in Recommendation", Nov. 9, 2024, 37 pages.
Hendricksen, M., et al., "Analyzing and Predicting Purchase Intent in E-Commerce: Anonymous vs. Identified Customers", Dec. 16, 2020, 10 pages.

* cited by examiner

*Primary Examiner* — Brandon S Cole
(74) *Attorney, Agent, or Firm* — Lathrop GPM LLP

(57) ABSTRACT

A method includes retrieving raw clickstream data of a multitude of visitors of a client application. A multitude of session sequences obtained from the raw clickstream data is processed to obtain a multitude of engagement scores corresponding to the multitude of visitors. A multitude of page sequences obtained from the raw clickstream data is processed to obtain a multitude of page entropies corresponding to the multitude of visitors. Interaction velocities of the multitude of visitors are computed based on an interaction velocity function. Feature vectors for the multitude of visitors, are generated, including the engagement scores, page entropies, and interaction velocities. The feature vectors are clustered to obtain clusters. Each cluster is assigned to a corresponding intent category. The intent categories are mapped to the visitors to obtain intent categories for the visitors.

18 Claims, 6 Drawing Sheets

620
NETWORK

622
NODE X

624
NODE Y

626
CLIENT DEVICE

UNSUPERVISED INTENT SEGMENTATION OF ANONYMOUS VISITORS USING MULTI-FACTOR INTERACTION ANALYSIS

BACKGROUND

Online user applications and platforms in diverse domains of finance, healthcare, retail, and education receive a disproportionate amount of site traffic from anonymous visitors, who are not among known users or customers. Anonymous visitors may engage with content, navigate across pages, and interact with various site elements. However, the intent of these anonymous visitors may remain opaque due to the absence of identity-linked data.

Behavioral traits of anonymous visitors are nuanced and dynamic as evidenced by analysis of raw clickstream data of the anonymous visitors. Models focusing on conversion prediction, propensity scoring, and relying on labeled data and post-authentication signals may not be applicable to infer the intent of anonymous visitors. A challenge arises in inferring and segmenting, or categorizing, visitor intent in real time, using exclusively behavioral signals derived from clickstream data.

SUMMARY

In general, in one aspect, one or more embodiments relate to a method. The method includes retrieving raw clickstream data of a multitude of visitors of a client application. The method further includes processing, by an engagement model, a multitude of session sequences obtained from the raw clickstream data, to obtain a multitude of engagement scores corresponding to the multitude of visitors. The method further includes processing a multitude of page sequences obtained from the raw clickstream data by an entropy model to obtain a multitude of page entropies corresponding to the multitude of visitors. The method further includes computing interaction velocities of the multitude of visitors based on an interaction velocity function. The method further includes generating feature vectors for the multitude of visitors, to obtain a multitude of feature vectors, each including at least an engagement score, a page entropy, and an interaction velocity. The method further includes processing, by an intent segmentation model, the multitude of feature vectors to obtain a predetermined number of clusters. The method further includes assigning each cluster of the predetermined number of clusters to a corresponding intent category.

In general, in one aspect, one or more embodiments relate to a system. The system includes at least one computer processor, and a multi-factor analytics engine, executing on the at least one computer processor. The multi-factor analytics engine is configured for retrieving raw clickstream data of a multitude of visitors of a client application. An engagement model of the multi-factor analytics engine is configured for processing a multitude of session sequences obtained from the raw clickstream data to obtain a multitude of engagement scores corresponding to the multitude of visitors. An entropy model of the multi-factor analytics engine is configured for processing a multitude of page sequences obtained from the raw clickstream data to obtain a multitude of page entropies corresponding to the multitude of visitors. The multi-factor analytics engine is further configured for computing interaction velocities of the multitude of visitors based on an interaction velocity function. The multi-factor analytics engine is further configured for generating feature vectors for the multitude of visitors, to obtain a multitude of feature vectors, each including at least an engagement score, a page entropy, and an interaction velocity, An intent segmentation model of the multi-factor analytics engine is configured for processing the multitude of feature vectors to obtain a predetermined number of clusters. The multi-factor analytics engine is further configured for assigning each cluster of the predetermined number of clusters to a corresponding intent category.

In general, in one aspect, one or more embodiments relate to a method. The method includes configuring a multi-factor analytics engine by performing operations including training an engagement model of the multi-factor analytics engine to generate an engagement score using a session sequence of a visitor of a client application. The operations further include calibrating an entropy model of the multi-factor analytics engine to generate a page entropy of a page sequence of the visitor of the client application. The operations further include training an intent segmentation model of the multi-factor analytics engine to generate a predetermined number of clusters corresponding to intent categories from feature vectors of sessions of the visitor of the client application. The method further includes deploying the multi-factor analytics engine. The method further includes receiving raw clickstream data of a multitude of visitors of the client application. The method further includes processing, by the engagement model, a multitude of session sequences obtained from the raw clickstream data, to obtain a multitude of engagement scores corresponding to the multitude of visitors. The method further includes processing, by the entropy model, a multitude of page sequences obtained from the raw clickstream data to obtain a multitude of page entropies corresponding to the multitude of visitors. The method further includes computing interaction velocities per session of the multitude of visitors based on an interaction velocity function of the multi-factor analytics engine. The method further includes generating the feature vectors per session for the multitude of visitors, to obtain a multitude of feature vectors, each including at least an engagement score, a page entropy, and an interaction velocity. The method further includes processing, by the intent segmentation model, the multitude of feature vectors to obtain the predetermined number of clusters. The method further includes assigning each cluster of the predetermined number of clusters to a corresponding intent category. The method further includes assigning an intent category corresponding to a cluster of the predetermined number of clusters to a visitor, based on a feature vector corresponding to the visitor being included in the cluster, to obtain intent categories corresponding to the multitude of visitors. The method further includes transmitting the multitude of visitors and the corresponding intent categories to an analytics application.

Other aspects of one or more embodiments will be apparent from the following description and the appended claims.

BRIEF DESCRIPTION OF DRAWINGS

Like elements in the various figures are denoted by like reference numerals for consistency.

DETAILED DESCRIPTION

One or more embodiments are directed to a system and method for unsupervised intent segmentation of anonymous visitors based on behavioral signals extracted from raw clickstream data. An anonymous visitor is defined as a visitor to a client application who is not (yet) a registered user or customer. Anonymous visitors may be in an early stage of her or his decision-making journey. Embodiments of the system are directed to an ensemble architecture that derives three custom behavioral metrics from the visitor's interaction history. First, an engagement score is generated by a deep learning engagement model that encodes a visitor's session-level sequence of page visits and actions into a scalar value representing engagement quality. A second metric, page entropy, is computed using Markov model simulations that quantify the diversity and randomness of a visitor's navigation path, capturing whether the journey is structured or exploratory. The third metric, interaction velocity, expresses the momentum and intensity of user activity, factoring in session duration, revisit cadence, and click rhythm.

The three behavioral metrics are computed over a rolling window of a predefined time period and combined with additional features derived from raw clickstream data, including structured user interface (SUI) entries, chat searches, bounce sessions, and total session duration. The resulting feature vectors are clustered by an intent segmentation model into a predetermined number of clusters. Based on the characteristics of the clusters, the clusters are assigned intent categories. The feature vectors of the clusters are mapped back to the visitors, causing the segmentation of the visitors into the intent categories.

Figure 1:
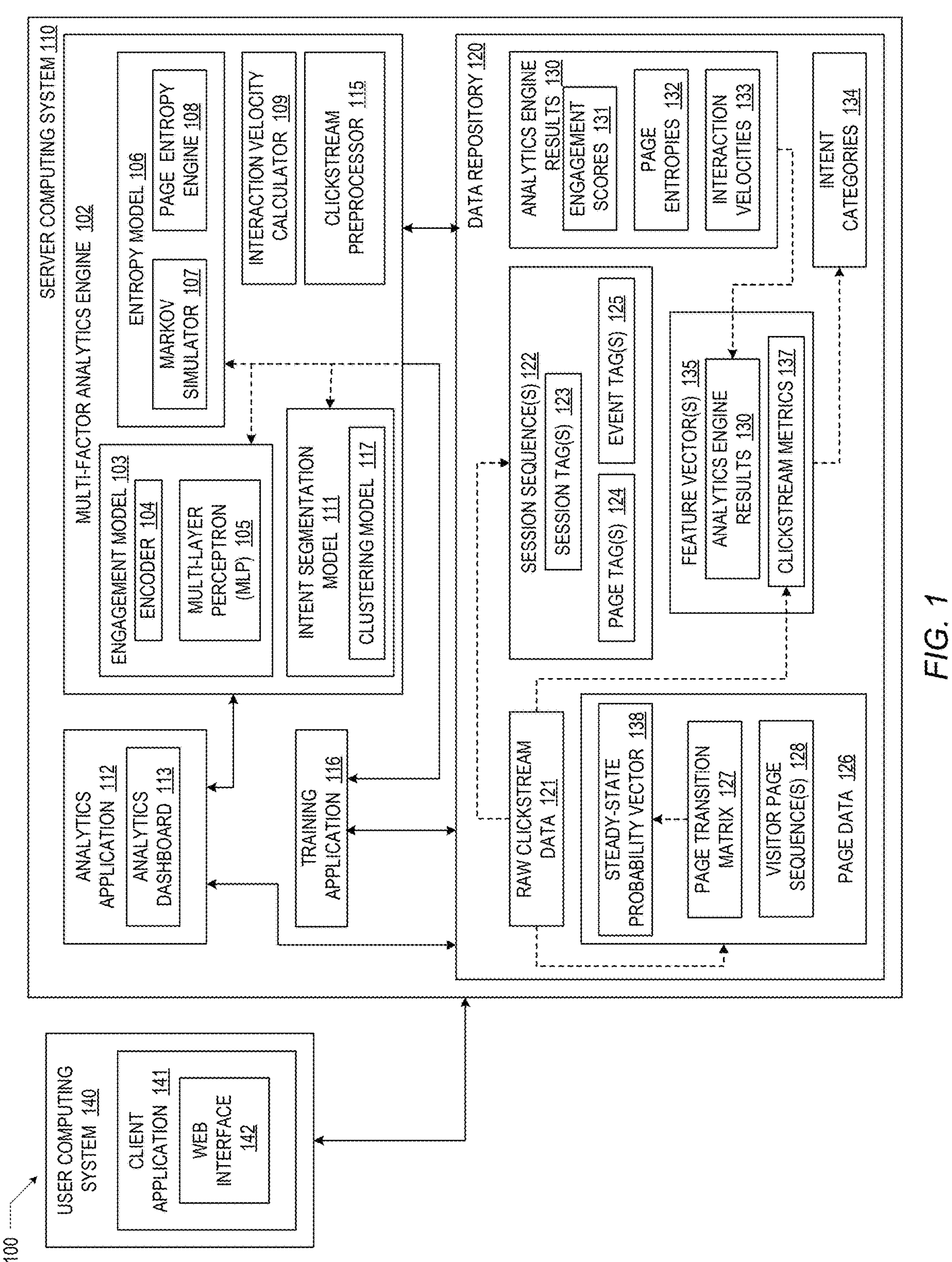
FIG. 1 shows a computing system, in accordance with one or more embodiments.

Attention is now turned to the figures. FIG. 1 shows a computing system, in accordance with one or more embodiments. The system shown in FIG. 1 may include a server computing system (110). The server computing system (110) includes one or more computer processors, data repositories, communication devices, and supporting hardware and software. The server computing system (110) may be in a distributed, virtual (cloud), and/or multiprocessor-based computing environment. The computer processor is one or more hardware or virtual processors that may execute computer readable program code defining one or more applications, such as the multi-factor analytics engine (102), the analytics application (112), or the training application (116). An example of the computer processor is described with respect to the computer processor(s) (602) of FIG. 6A. Thus, the server computing system (110) is configured to execute one or more applications, such as the multi-factor analytics engine (102), the analytics application (112), or the training application (116). An example of a computer system and network that may form the server computing system (110) is described with respect to FIG. 6A and FIG. 6B.

FIG. 1 shows a data repository (120), which is a type of storage unit or device (e.g., a file system, database, data structure, or any other storage mechanism) for storing data. The data repository (120) may include multiple different, potentially heterogeneous, storage units and/or physical storage devices. The data repository (120) includes raw clickstream data (121). The raw clickstream data (121) includes unprocessed logs of user interactions with the client application, such as page views, clicks, scrolls, and other events. For example, a visitor may click on the homepage, scroll through a product listing, and then click on a pricing link. Each of these actions may be recorded as part of the raw clickstream data (121). The data repository (120) further includes session sequence(s) (122). A session sequence (122) is a temporally ordered collection of user interactions grouped into a session, typically defined by a period of activity separated by inactivity.

For instance, a visitor may interact with the site in a session from 10:00 AM to 10:15 AM, and again in another session at 2:00 PM to 2:30 PM. Each period may be encoded as a distinct session in the session sequence (122). The user interactions may be represented as tokens. The tokens encode the user interaction. Thus, the session sequence (122) is an ordered sequence of tokens. Specifically, the tokens included in a session sequence may be of the following types-session tag(s) (123), page tag(s) (124), and event tag(s) (125). A session tag (123) is a label or identifier associated with a session, such as "visitor 1, session 3<timestamp>; mobile." The session tags (123) may "book-end" a particular session of a session sequence (122). A page tag (124) may identify the category or type of a page, such as "homepage," "pricing," or "product detail." An event tag (125) identifies specific user-triggered actions, such as "video play," "add to cart," or "form submit." Thus, the session sequence (122) is a sequence of tokens extracted from the raw clickstream data that encode the page visits of a visitor and the actions taken on a particular page being visited, within a particular session. By way of example, a session sequence may include ['Session 1 Start', 'Visit Homepage', 'started video clicked video title', 'interacted content displayed feature drawer', 'Visit Product', 'interacted on account creation email clicked field', . . . , 'Session 4 End'] A multitude of sessions may be encoded in the session sequence. A detailed description of a session sequence is provided in reference to the example shown in FIG. 3.

A session sequence may include, for a visitor (V1), five sessions. In one of these five sessions, V1 may visit a pricing page, view a particular product, search for a product, play a review video of the product, etc. Accordingly, the session sequence may include {Begin session, timestamp; home page; product page; action: search, "lawnmowers;" product detail; action: video play; product page; End Session, timestamp; Begin session, timestamp; home page; product page; action: search, "leaf blowers," product detail; action: view customer review; product page; End session, timestamp}. Thus, a session sequence may include more than one individual session of a visitor. An individual session may include one or more page visits and actions on the pages. The sessions of a particular visitor may be extracted from raw clickstream data over a rolling window of a predefined time period, for example, seven days, forty eight hours, etc.

The data repository (120) includes page data (126). The page data (126) includes one or more visitor page sequence (s) (128). A visitor page sequence (128) is an ordered sequence of page categories that a visitor to the client application viewed, or "visited" over a rolling window of a predefined time period. For example, a visitor A may have viewed the homepage, then viewed the products page, then viewed three individual product pages. Here, the sequence of page categories may be (Homepage, Products, Product detail, Products, Product detail, Products, Product detail). The sequences of page categories for multiple sessions may be aggregated into a rolling window of a predefined time period, for example, seven days. The aggregated sequence of page categories of a visitor in the rolling window of the predefined time period (e.g., seven days) constitutes a visitor page sequence for a particular visitor.

The data repository (120) includes a page transition matrix (127). The page transition matrix (127) is a two-dimensional array representing the probabilities of transitioning from a first page category to a second page category, based on historical visitor behavior. For example, the matrix may indicate that visitors who view the homepage have a 40% probability of next visiting the pricing page and a 30% probability of visiting the product page. In one or more embodiments, the page transition matrix (127) may be compiled by aggregating page categories visited by visitors of the client application over a rolling window of a larger time period, for example, thirty days. The page transition matrix may further include terminal states corresponding to the outcome of the visitor interaction, for example "converted" or "non-converted."

The data repository (120) includes a steady-state probability vector (138). The steady-state probability vector (138) includes long-run probabilities of being on each page category, computed from the page transition matrix (127) using a Markov simulation. For example, the steady-state probability vector (138) may indicate that over time, 25% of visitors are likely to be on the product page, 20% on the pricing page, and 15% on the homepage.

The data repository (120) includes analytics engine results (130). The analytics engine results (130) include engagement scores (131), page entropies (132), and interaction velocities (133). An engagement score (131) is a scalar value between 0 and 1 representing the visitor's level of engagement. A page entropy (132) quantifies the randomness in the visitor's page navigation using Shannon entropy. An interaction velocity (133) measures the rate and intensity of user interactions, such as clicks per minute or pages per session.

The data repository (120) includes feature vector(s) (135). A feature vector (135) is a numerical representation of a visitor's behavior, constructed from various metrics and tags. For example, a feature vector may include values for engagement score, page entropy, interaction velocity, that is, analytics engine results (130), obtained from the multi-factor analytics engine (102). The feature vectors (135) may additionally include one or more clickstream metrics (137). The clickstream metrics (137) include derived measurements such as a signup interface (SUI) entry count, a chat count, a bounce session count, and a total session duration, etc. For example, a visitor who spends 10 minutes on the site and revisits the pricing page three times may have a high revisit frequency metric.

The data repository (120) includes intent categories (134). An intent category (134) represents a classification of a visitor's intent based on behavioral features. For example, a visitor with high engagement, low entropy, and high interaction velocity may be assigned to a "high intent" segment, while a visitor with low engagement and high entropy may be assigned to a "medium intent" segment. A detailed description of assigning clusters of visitors to diverse intent categories based on cluster characteristics is provided in reference to FIG. 5.

The system includes a multi-factor analytics engine (102). The multi-factor analytics engine (102) is software or application-specific hardware, which, when executed on a computer processor, coordinates and invokes diverse machine learning and artificial intelligence (AI) models to compute behavioral metrics from clickstream data and generate intent predictions. The multi-factor analytics engine (102) includes multiple machine learning and AI models, each responsible for deriving a distinct behavioral signal.

The multi-factor analytics engine (102) includes an engagement model (103). The engagement model (103) is a deep learning model configured to compute a scalar engagement score for a visitor session. The engagement model (103) includes an encoder (104) and a multi-layer perceptron (MLP) (105). The encoder (104) may be a stack of encoder blocks, for example, a stack of six encoder blocks. Each encoder block may include multiple layers. The encoder (104) may further include residual connections. The multi-layer perceptron (105) receives a pooled vector from the encoder (104) and outputs a scalar logit, which is transformed into a probability score representing engagement, shown as the engagement scores (131) in the analytics engine results (130) in the data repository (120).

The multi-factor analytics engine (102) includes an entropy model (106). The entropy model (106) is software or application-specific hardware, which, when executed on the computer processor, is configured to quantify the randomness of a visitor's page navigation behavior. The entropy model (106) includes a Markov simulator (107) and a page entropy engine (108). The Markov simulator (107) applies a transition matrix to a state vector to compute steady-state probabilities of page categories. When the state vector reaches a state of convergence, the state vector is stored as the steady-state probability vector (138) in the page data (126). The page entropy engine (108) uses the steady-state probabilities in Shannon entropy calculations to produce a page entropy score for a visitor session. The page entropy scores are shown as page entropies (132) in the analytics engine results (130) in the data repository (120).

The multi-factor analytics engine (102) includes an interaction velocity calculator (109). The interaction velocity calculator (109) is software or application-specific hardware, which, when executed on the computer processor, implements a function that computes the rate and intensity of user interactions during a session. The interaction velocity calculator (109) may use inputs such as the number of events, number of pages visited, session duration, and recency of return visits. For example, a visitor who viewed five pages and triggered ten events in a three-minute session may have a high interaction velocity.

The multi-factor analytics engine (102) includes a clickstream preprocessor (115). The clickstream preprocessor (115) is software or application-specific hardware, which when executed on the computer processor, extracts and formats raw clickstream data into inputs for the engagement model (103), and the entropy model (106). For instance, the clickstream preprocessor (115) may extract session tags, page tags, and event tags from raw clickstream data. The clickstream preprocessor (115) may then prepare ordered sequences of the tags for input into the engagement model (103). Additionally, the clickstream preprocessor (115) may aggregate page categories visited by a visitor in one or more sessions into the visitor page sequences (128).

The multi-factor analytics engine (102) includes an intent segmentation model (111). The intent segmentation model (111) is configured to assign visitor sessions to intent categories based on behavioral features. The intent segmentation model (111) includes a clustering model (117). The clustering model (117) may be a k-means clustering model trained on feature vectors having engagement scores, page entropy scores, interaction velocity scores, and clickstream metrics.

The system includes an analytics application (112), which is a user-facing interface that displays behavioral insights and intent predictions of visitors. The analytics application (112) further includes an analytics dashboard (113). The analytics dashboard (113) presents visualizations of engagement scores, entropy distributions, velocity metrics, and intent segments across visitor cohorts.

The system further includes a training application (116). The training application (116) is software or application-specific hardware, which when executed on the computer processor, configures, and trains the engagement model (103), entropy model (106), and clustering model (117) using clickstream data. The training application (116) may include functionality for computing loss functions, performing backpropagation, and validating model performance.

The system (100) includes a user computing system (140). The user computing system (140) may be considered remote or local. A remote user computing system may be operated by a third-party (e.g., an end user of a chatbot) that does not control or operate the system of FIG. 1. Similarly, the organization that controls the other elements of the system of FIG. 1 may not control or operate the remote user computing system. Thus, a remote user computing system may not be considered part of the system of FIG. 1. In contrast, a local user computing system is operated under the control of the organization that controls the other components of the system of FIG. 1. Thus, a local user computing system may be considered part of the system of FIG. 1.

The user computing system (140) is a computing system used by a user to submit a user query. The user computing system (140) may include a display for displaying the web interface (142) of a client application (141) and an input device for receiving input from the user. The user computing system (140) may further include a network interface for connecting the user computing system (140) to the server computing system (110). The user computing system (140) may be configured to execute the client application (141) with the web interface (142). In one or more embodiments, the client application (141) may be a web-based client application, operating within a web browser. Other embodiments of the client application (141) may include native desktop applications, mobile applications, remote desktop clients, etc. The client application (141) may be serviced by one or more SaaS applications (not shown) executing on the server computing system (110). For example, the SaaS application may be an office productivity based application (e.g., Office 365®), a graphics based application, a financial application (e.g., QuickBooks®), a multi-media application, or other type of application.

While FIG. 1 shows a configuration of components, other configurations may be used without departing from the scope of one or more embodiments. For example, various components may be combined to create a single component. As another example, the functionality performed by a single component may be performed by two or more components.

Figure 2:
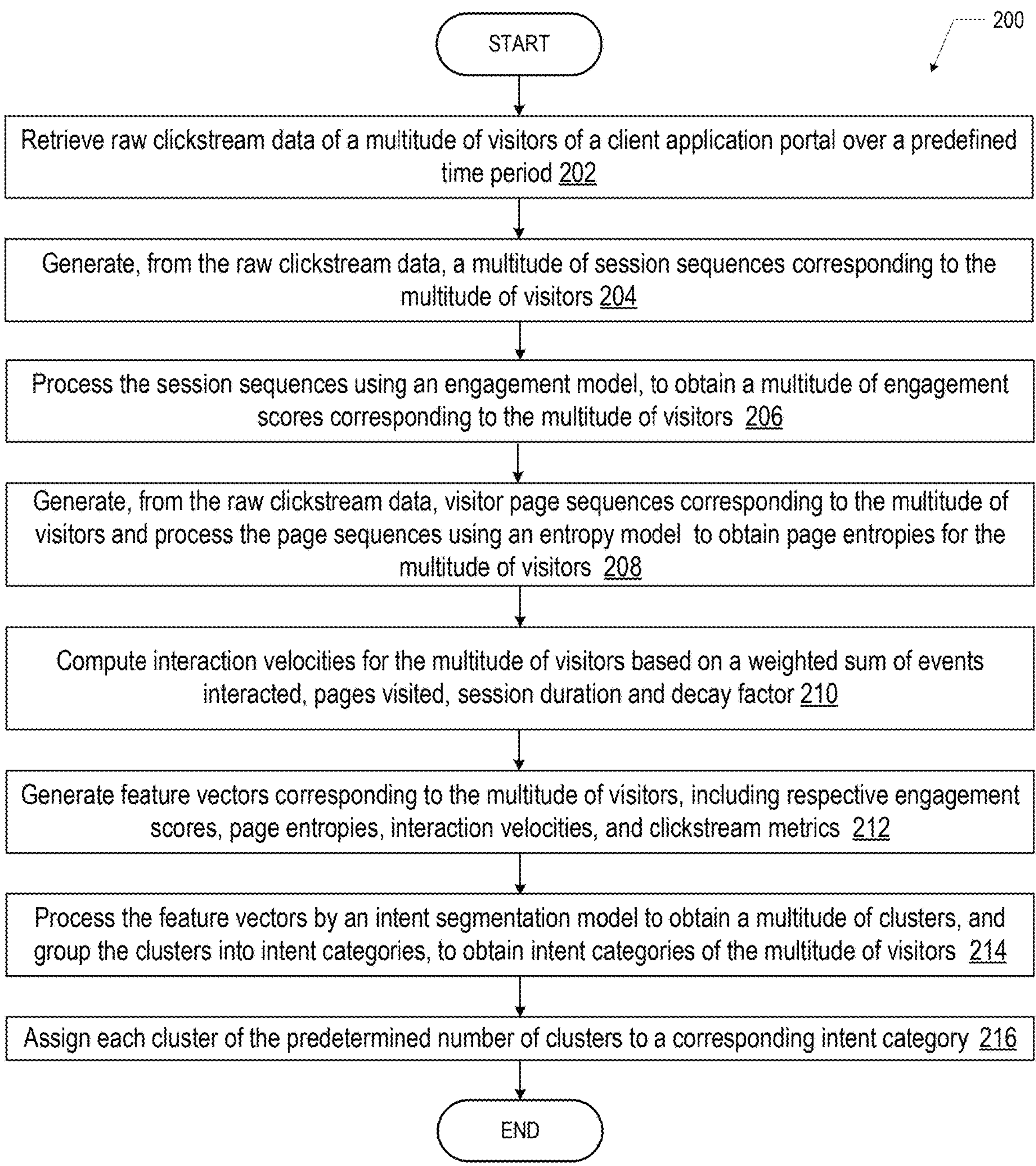
FIG. 2 shows a flowchart of a method, in accordance with one or more embodiments.

FIG. 2 shows a flowchart (200) of a method for unsupervised determination of anonymous visitor intent, in accordance with one or more embodiments. The method of FIG. 2 may be implemented using the system of FIG. 1 and one or more of the steps may be performed on or received at one or more computer processors. While the various steps in the flowchart 200 are presented and described sequentially, at least some of the steps may be executed in different orders, may be combined, or omitted, and at least some of the steps may be executed in parallel. Furthermore, the steps may be performed actively or passively.

In Block 202, raw clickstream data of a multitude of visitors of a client application over a predefined time period is retrieved. In one or more embodiments, the visitor analytics application may invoke the multi-factor analytics engine to perform intent segmentation of the multitude of factors. Accordingly, the clickstream preprocessor of the multi-factor analytics engine may retrieve the raw clickstream data that is collected continuously from the client application, corresponding to the multitude of visitors.

In Block 204, a multitude of session sequences corresponding to the multitude of visitors is generated from the raw clickstream data. In one or more embodiments, the clickstream preprocessor may extract, for a particular visitor, a session sequence. The session sequence may include an ordered sequence of tokens. The tokens may include at least one of a session tag, a page tag, and an event tag. The tokens may be arranged in the sequence in a chronological order. A session tag may mark the beginning and/or end of an individual session. Between two session tags, one or more page tags or event tags may encode the visitor interaction of the session.

In Block 206, the session sequences are processed using the engagement model of the multi-factor analytics engine, to obtain a multitude of engagement scores corresponding to the multitude of visitors. In one or more embodiments, the engagement model may process a multitude of session sequences obtained from the raw clickstream data, to obtain a multitude of engagement scores corresponding to the multitude of visitors.

In one or more embodiments, the engagement model may be trained prior to being deployed in the multi-factor analytics engine. To train the engagement model, a training application may obtain the raw clickstream data from a multitude of visitors to the client application over a predefined time period. From the raw clickstream data, the clickstream preprocessor may generate a session sequence for each visitor. Each element of the sequence is a token representing one of three types: a session tag (indicating the start or end of a session), a page tag (representing the category of a visited URL), or an event tag (describing an action taken on a page). The tokens are ordered chronologically to preserve the behavioral flow of the visitor journey.

The session sequence for a visitor may be aggregated over a rolling window of a predefined time period, for example, seven days. The session sequence may be embedded using a pre-trained language model. An example of a pre-trained model that generates embeddings for tokens of the session sequence may be all-MiniLM-L6-v2®, which produces 384-dimensional embeddings for each token. The token embeddings may then be processed by the six-layer transformer-based encoder, which models the contextual relationships between tokens using residual connections and multi-head attention mechanisms. The output of the six-layer transformer-based encoder may be a sequence of contextualized token embeddings, corresponding to the tokens of the session sequence for each input token.

To summarize the sequence, the model applies a pooling operation for example, multi-head attention pooling, to produce a single aggregated vector that represents the visitor's overall engagement across the rolling window of the predefined time period. The aggregated, or pooled, vector is then passed through a two-layer multi-layer perceptron (MLP), which transforms the representation into a scalar logit. The model is trained to predict the probability of conversion using binary cross-entropy loss, where the label indicates whether the visitor ultimately converted (e.g., signed up or made a purchase). Regularization techniques such as dual dropout, GELU activation, and LayerNorm are applied to improve generalization and prevent overfitting.

Accordingly, in one or more embodiments a session sequence corresponding to a visitor may be generated from the raw clickstream data. The session sequence may include a multitude of tokens. In one or more embodiments, the multitude of tokens may be ordered in chronological order of occurrence. Each token may be one of a session tag, a page tag, and an event tag. A multitude of session sequences may be obtained in a similar manner. For a session sequence of the multitude of session sequences, an embedding model may be used to generate a multitude of token embeddings corresponding to a multitude of tokens of the session sequence. Further, the encoder of the engagement model may process the multitude of token embeddings, to obtain a multitude of contextualized token embeddings. The multitude of contextualized token embeddings may then be pooled into a single output embedding. The single output embedding may be processed by the MLP of the engagement model to obtain a predicted engagement score. Furthermore, the predicted engagement score may be compared to a binary conversion label using a binary cross entropy loss function to obtain a loss function value. A gradient of the loss function value with respect to the predicted engagement score may be computed. The gradient may be backpropagated through the MLP of the engagement model to update first weights of the MLP. The gradient may further be backpropagated through the encoder of the engagement model to update second weights of the encoder.

In Block 208, visitor page sequences corresponding to the multitude of visitors may be generated, from the raw clickstream data. Further the page sequences may be processed using the entropy model to obtain page entropies for the multitude of visitors. In one or more embodiments, a multitude of page sequences obtained from the raw clickstream data may be processed by the entropy model of the multi-factor analytics engine to obtain a multitude of page entropies corresponding to the multitude of visitors.

In one or more embodiments, prior to being deployed in the multi-factor analytics engine, the page entropy model may be calibrated. Calibrating the page entropy model may entail performing operations including generating, from the raw clickstream data, a multitude of ordered page visit pairs. Each page visit pair may include a first page and a second page. In the page visit pair, the second page may be visited from the first page. Further, a page transition matrix may be generated using the multitude of ordered page visit pairs. The page transition matrix may include probabilities of visits from the first page to the second page. Further, a Markov function may be applied to the page transition matrix to obtain a steady-state probability vector. The steady-state probability vector may include steady state probabilities corresponding to pages of the page transition matrix.

As used herein, a Markov simulation refers to the application of a Markov model to a transition matrix derived from observed page visit sequences. In one or more embodiments, the Markov model may be implemented as a function in which a transition matrix is iteratively multiplied with a state vector representing a probability distribution over possible states. Through repeated application, the state vector evolves from an initial distribution to a steady-state distribution. In the steady-state distribution, further application of the transition matrix yields no substantial change in the state vector. In the current context, the state vector represents a probability distribution over page categories.

Notably, for configuring the page entropy model, visitor page sequences may be extracted from raw clickstream data corresponding to a multitude of visitors, over a rolling window of a predefined time period, for example, 30 days. Further, the multitude of visitor page sequences may be aggregated into an aggregated page sequence. The aggregated page sequence may be used by the training application to generate the page transition matrix. In one or more embodiments, the calibrated entropy model may be deployed when the multi-factor analytics engine is deployed.

In one or more embodiments, in a deployment phase, a visitor page sequence may be extracted from the raw clickstream data by the clickstream preprocessor. A multitude of visitor page sequences may be extracted in a similar manner. For a (visitor) page sequence of the multitude of (visitor) page sequences, the page entropy engine of the calibrated entropy model may assign steady-state probabilities corresponding to pages in the page sequence from the steady-state probability vector of the entropy model. Page probabilities of the pages in the page sequence may thus be obtained. Further, the page entropy engine may apply an entropy function to the page probabilities to obtain a page entropy value, for example, a Shannon entropy function. Additionally, the page entropy engine may apply a decay factor to the page entropy value, to obtain a page entropy. A multitude of page entropies may be obtained in a similar manner.

In one or more embodiments, the Shannon entropy function may compute the entropy in accordance with Equation (1):

$$H_i = -\sum_{k=1}^{n} P(p_k)\cdot \log_2(P(p_k))$$

$$\text{for a visitor sequence } S=[p_1, p_2, \ldots, p_n] \quad (1)$$

In Equation 1, $H_i$ is the Shannon entropy value for the $i^{th}$ session, S is the visitor page sequence of n pages, $p_1$, $p_2$, . . . , $p_n$ visited in the session, $p_k$ is the $k^{th}$ page, and P is the steady-state probability of the $k^{th}$ page, assigned to the $k^{th}$ page using the steady-state probability vector of the calibrated entropy model.

The values obtained for the pages in a session are aggregated over multiple sessions of the particular visitor over the rolling window of the predefined time period, applying a decay factor to give more weight to recent behavior. In one or more embodiments, the cumulative entropy value may be aggregated in accordance with Equation (2):

$$C_{pe}=\Sigma[\text{hourly decay factor}\times H_i] \quad (2)$$

In Equation (2), $C_{pe}$ is the aggregated page entropy of a visitor in the rolling window of the predefined time period. $H_i$ is the page entropy of the visitor in the $i^{th}$ session.

In Block 210, interaction velocities are computed for the multitude of visitors. The computation is based on a weighted sum of events interacted, pages visited, session duration, and decay factor. In one or more embodiments, the weighted sum may be computed using an interaction velocity function. The interaction velocity function may compute an interaction velocity of a visitor in an individual session in accordance with Equation (3):

$$V_i = \alpha_1 \times \ln\left(1+\frac{\text{Events interacted}}{\text{Session duration}}\right) + \alpha_2 \times \ln\left(1+\frac{\text{Pages viewed}}{\text{Session duration}}\right) + \alpha_3 \times \ln(1+\text{Session duration}) + \alpha_4 \times \ln(1+\text{Recency score}) \quad (3)$$

In Equation (3), $\alpha_1$, $\alpha_2$, $\alpha_3$, and $\alpha_4$ are sample weights. $V_i$ is the interactive velocity value of the $i^{th}$ session.

Multiple interaction velocity scores may correspond to multiple sessions in a session sequence of a particular visitor. Accordingly, the interaction velocities of the sessions of a visitor may be aggregated over the rolling window of the predefined time period, by applying a decay factor, in accordance with Equation (4):

$$C_{iv}=\Sigma[\text{hourly decay factor}\times V_i] \quad (4)$$

Thus, the interaction velocity of a visitor over multiple sessions during the rolling window of the predefined time period may be obtained in accordance with Equation (3), which computes an interaction velocity of an individual session, and Equation (4), which aggregates interaction velocities of multiple sessions in the rolling window of the predefined time period.

In Block 212, feature vectors corresponding to the multitude of visitors, are generated, including respective engagement scores, page entropies, interaction velocities, and clickstream metrics. In one or more embodiments, feature vectors may be generated for the multitude of visitors, to obtain a multitude of feature vectors. Each feature vector may include at least an engagement score ($C_{es}$), a page entropy ($C_{pe}$), and an interaction velocity ($C_{iv}$). The engagement score, page entropy, and interaction velocity of a particular feature vector correspond to the particular visitor for which the feature vector is generated. Additionally, clickstream metrics of the particular visitor may be added to the feature vector. The clickstream metrics may include at least a SUI entry(ies) count ($C_{SUI}$), a chats count ($C_{chat}$), a bounce sessions count ($C_{bounce}$), and a total session duration ($C_{ts}$). Thus, a feature vector may be defined in accordance with Equation (5) as:

$$F:=[C_{SUI},C_{chat},C_{bounce},C_{ts},C_{es},C_{pe},C_{iv}] \quad (5)$$

In Block 214, the feature vectors are processed by an intent segmentation model to obtain a multitude of clusters. Further, the clusters are assigned intent categories. Thus, intent categories of the multitude of visitors may be obtained. In one or more embodiments, the intent segmentation model may process the multitude of feature vectors to obtain a predetermined number of clusters. More particularly, the clustering model of the intent segmentation model may cluster the feature vectors into the predetermined number of clusters.

In one or more embodiments, prior to processing the feature vectors, the intent segmentation model may be configured and trained. More particularly, the clustering model of the intent segmentation model may be trained. In one or more embodiments, the clustering model may be a k-means clustering model, to group visitor sessions based on behavioral features. To configure the clustering model effectively, an optimal number of clusters may be selected using quantitative evaluation techniques. Two commonly used methods for determining the optimal number of clusters are the elbow point method and the silhouette score. The elbow point method involves analyzing the rate of decrease in clustering cost as the number of clusters increases, and identifying the point at which further increases yield diminishing returns. The silhouette score measures how well-separated and cohesive the resulting clusters are, based on the relative distances between data points within and across clusters. These methods may be used in combination to determine a cluster count that balances model simplicity with segmentation quality.

Accordingly, in one or more embodiments, an optimal number of clusters for the clustering model of the intent segmentation model may be determined. The determination may entail performing operations including computing a multitude of clustering cost metrics for a multitude of candidate cluster counts.

Each clustering cost metric of the multitude of clustering cost metrics may include a within-cluster sum of squared distances. The operations may further include computing a difference between a first clustering cost metric corresponding to a first cluster count and a second clustering cost metric corresponding to a second cluster count. The second cluster count may be consecutive to the first cluster count, by a unit increase in the number of clusters. For example, if the first cluster count is 4, then the second cluster count may be 5, or 6, depending on the unit increase. Responsive to the difference failing to satisfy a cost reduction threshold, the first cluster count may be selected as an inflection point.

In one or more embodiments, the multitude of clustering cost metrics may be plotted against the multitude of candidate cluster counts to generate a cost curve. The inflection point may be identified on the cost curve. The inflection point, referred to as the "elbow point" may correspond to a cluster count beyond which reductions in clustering cost diminish significantly. The elbow point may correspond to the maximum number of clusters beyond which the cost reduction (the difference between two consecutive clustering cost metrics on the cost curve) fails to satisfy the cost reduction threshold. In one or more embodiments, an inflection point may be identified on the cost curve.

Determining the optimal number of clusters may further entail computing silhouette scores for the candidate cluster counts using a silhouette scoring function. The optimal number of clusters may be selected based on the inflection point (elbow point) and the candidate cluster count yielding a highest silhouette score. In one or more embodiments, silhouette scores may be computed for the multitude of candidate cluster counts using a silhouette scoring function. The optimal number of clusters may be selected from the inflection point and the candidate cluster count yielding a highest silhouette score.

In one or more embodiments, the clustering model may be trained. The training may entail operations including configuring the clustering model to generate the predetermined optimal number of clusters, for example, four clusters. The clustering model may then process a training dataset of the multitude of feature vectors, to obtain the predetermined number of clusters.

More particularly, to train the clustering model configured to generate the predetermined optimal number of clusters, a training dataset of feature vectors may be retrieved by the training application. The clustering model may be initialized with the predetermined optimal number of clusters. Initial centroids may be selected for each cluster, for example, a random value, or k-means++ method, to improve convergence. The clustering model may then assign each feature vector of the training dataset to the nearest centroid based on Euclidean distance. Once assignments are made, the centroids may be recalculated by averaging the feature vectors within each cluster. The assignment and update steps may be iterated until the centroids stabilize or a predefined number of iterations is reached. Through the process described herein, the training dataset may be partitioned into the predefined optimal number of distinct clusters (e.g., 4), each represented by a learned centroid. When deployed in the multi-factor analytics engine, the trained clustering model may be used to classify new data points by assigning them to the nearest of the cluster centroids.

Once the feature vectors are clustered into the predetermined number of clusters, each cluster of the predetermined number of clusters may be assigned to a corresponding intent category. Accordingly, in Block 216, each cluster of the predetermined number of clusters is assigned to a corresponding intent category. Further, an intent category corresponding to a cluster of the predetermined number of clusters may be assigned to a visitor, based on a feature vector corresponding to the visitor being included in the cluster. The assignation of a cluster to an intent category may be affected via additional business logic of the intent segmentation model, for example, a rule system, based on observed behavior of visitors and corresponding conversions. The rule system may use the feature weights of the feature vector as threshold values to determine the intent category. Intent categories corresponding to the multitude of visitors may be obtained in similar manner.

By way of example, visitors in a lowest intent category may exhibit minimal engagement and conversion likelihood. The feature vectors of these visitors may include a high bounce rate, low session duration, minimal chat activity, and register low scores across engagement score, page entropy, and interaction velocity. In contrast, visitors in a highest intent category may demonstrate strong engagement and a high likelihood of conversion. The feature vectors of the visitors may reflect a low bounce rate. The visitors may be repeat users, with high session duration, frequent chat activity, and high engagement scores, page entropy, and interaction velocity all exceeding baseline values.

In one or more embodiments, the intent categories may be presented in the visitor analytics application. In one or more embodiments, the multitude of visitors and corresponding intent categories may be transmitted to an analytics application as a payload from the multi-factor analytics engine. Further, the payload may be visualized and displayed in a dashboard of the analytics application.

Figure 3:
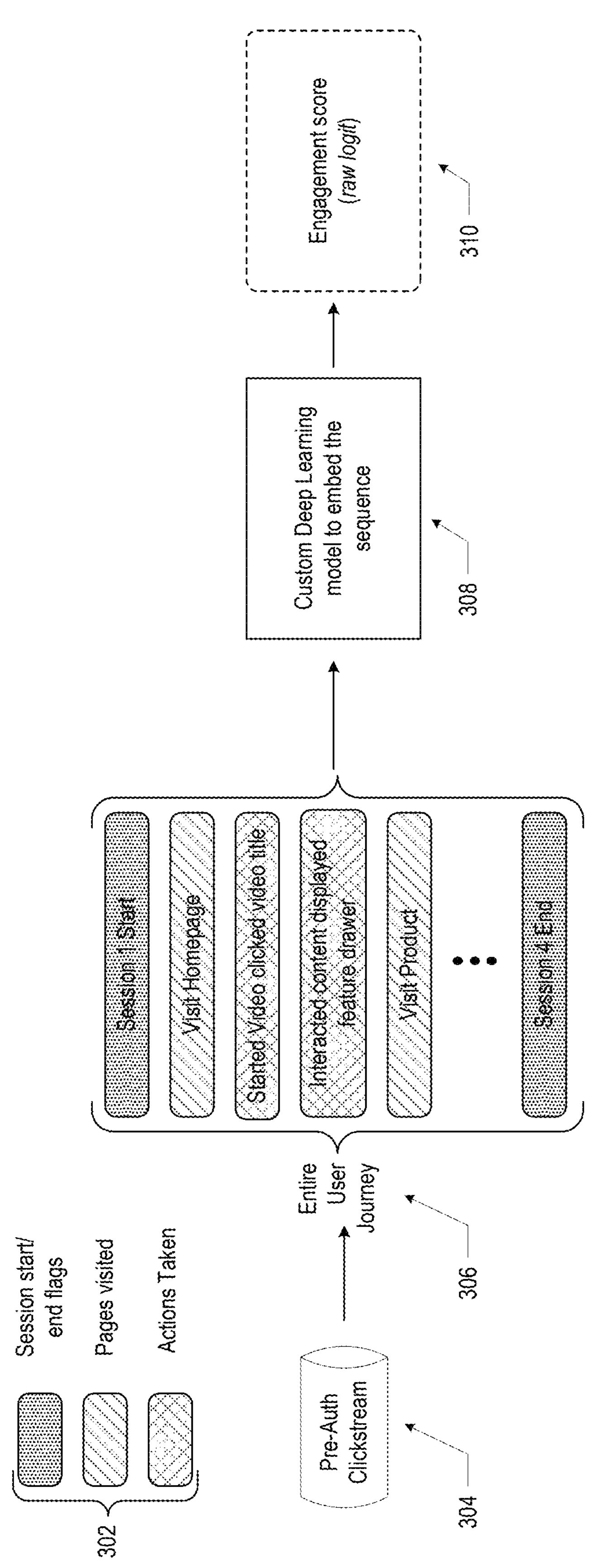
FIGS. 3, 4, and 5 show examples, in accordance with one or more embodiments.

FIG. 3 shows an example implementation of the operation of the engagement model, in accordance with one or more embodiments. The following example is for explanatory purposes only and not intended to limit the scope of one or more embodiments.

Section 302 shows a legend that defines the visual tags used to represent different types of events within a session sequence. Specifically, the tags include "Session Start/End Flags," "Pages Visited," and "Actions Taken." The tags provide a basis for the embedding model for decoding the session sequences and understanding and interpreting user behavior.

Item 304 represents the raw clickstream data, labeled as "Pre-Auth Clickstream." The raw clickstream data captures the unprocessed stream of user interactions prior to authentication, including every page view, click, and action taken across sessions. The raw clickstream data serves as the foundational input for the engagement model, from which meaningful behavioral patterns are extracted. The raw clickstream data is used to derive the structured sequences shown in subsequent blocks.

Item 306 shows the transformation of raw clickstream data into structured session sequences. Each session is marked by a start and end flag (session tags), and the intervening events are categorized as either page visits (page tags) or user actions (event tags). For example, a session may begin with a homepage visit, followed by a video interaction, content engagement, and navigation to a product page, ultimately ending with a session termination flag. The structured form of the session sequence facilitates the engagement model to analyze temporal and behavioral patterns across multiple sessions.

Block 308 shows the application of the engagement model, which is the custom deep learning model, to the session sequences. The model embeds each tagged interaction into a latent space, capturing semantic and behavioral nuances across sessions. By processing the ordered sequence of tags, the model learns to identify engagement signals that correlate with user intent, such as repeated visits, content interactions, or product exploration.

Block 310 presents the output of the deep learning model in the form of an engagement score, labeled as "Raw logit." The engagement score quantifies the level of user engagement based on the embedded session sequence. The engagement score is used as an input to downstream components such as the intent segmentation model. The engagement score serves to differentiate between low- and high-intent visitors.

Figure 4:
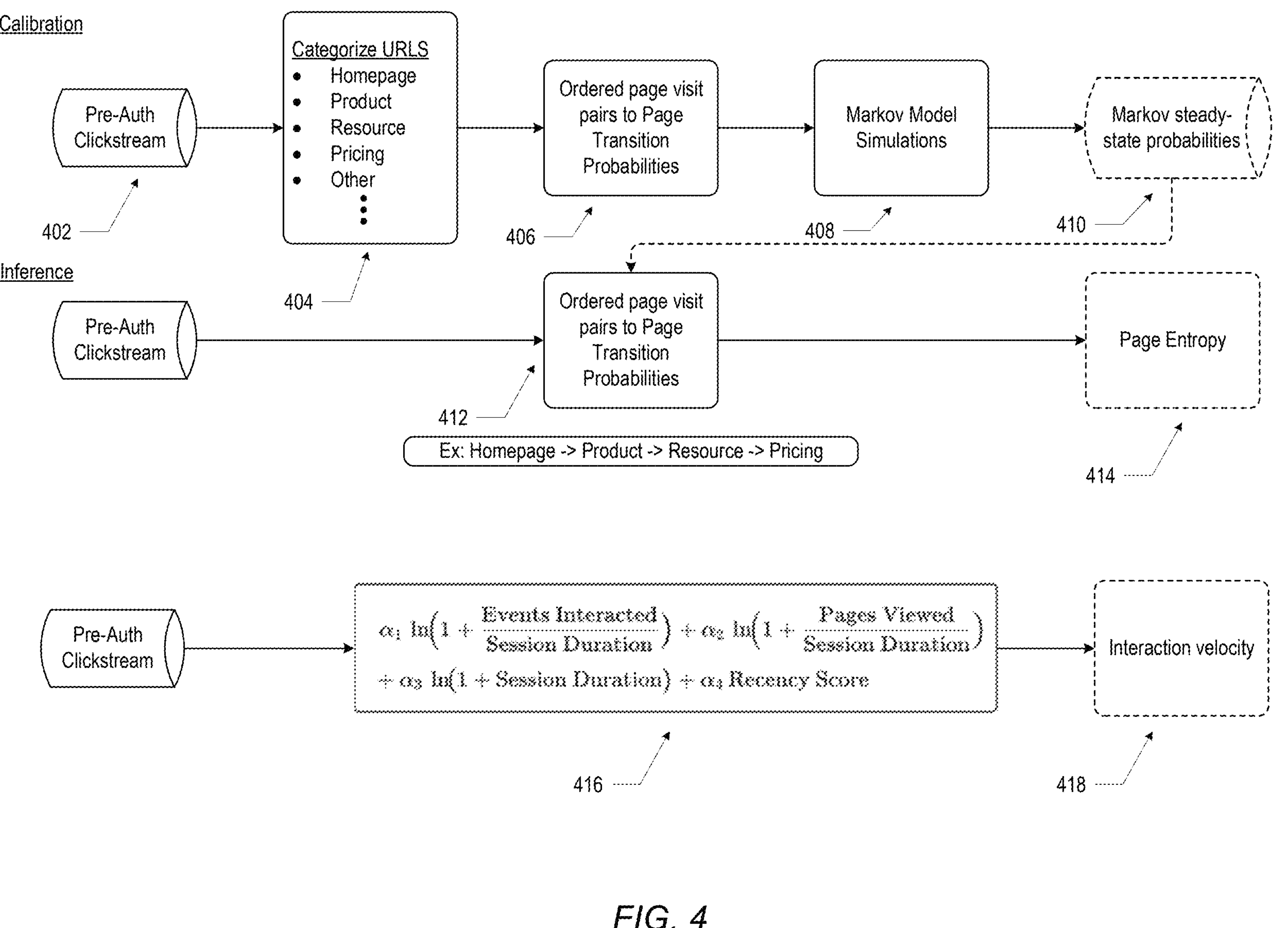

FIG. 4 shows an example implementation of the calibration and operation of the entropy model, in accordance with one or more embodiments. The following example is for explanatory purposes only and not intended to limit the scope of one or more embodiments.

In FIG. 4, the flow is divided into two main sections: calibration (Items 402-410) and operation (Blocks 412-414), each representing distinct phases in the entropy modeling pipeline.

Item 402 shows the "Pre-Auth Clickstream," which serves as the foundational input for the entropy model. The Pre-Auth Clickstream captures raw user navigation data prior to authentication, including page visits and transitions. The data is unstructured at this stage and includes sequences of URLs visited by users across sessions.

Item 404 shows the categorization of URLs into semantic groups such as Homepage, Product, Resource, Pricing, and Other. The categorization facilitates the model to abstract away from specific URLs and instead focus on the behavioral patterns associated with different types of content. By grouping URLs, the model can generalize across user journeys and reduce noise in the entropy calculations.

Item 406 converts ordered page visit pairs into page transition probabilities. Conversion to page transition probabilities involves analyzing the sequence of page visits to determine how likely users are to move from one category to another. The transition probabilities form the basis for modeling user navigation as a stochastic process. In an example implementation, visitors' clickstream sequences may be processed by journey, where each journey represents continuous web activity ending in conversion (conv) or abandonment (no_conv). Sequences with more than two distinct page visits may be retained. Journey sequences may be augmented with a synthetic (start) state prepended and terminal states (conv) or (no_conv) appended. To obtain the transition probability matrix, for each sequence [start, $p_1$, $p_2$, . . . , $p_n$, terminal], consecutive pairs ($p_i$, $p_{i+1}$) may be extracted. Raw counts C(orig, dest) may be computed for all observed transitions. The probability of a transition from page i to page j may be normalized for each origin state i. The transition probabilities may be adjusted by origin state conversion rates. Further, a damping factor may be added to prevent terminal state absorption ergodicity.

Item 408 represents the execution of Markov model simulations. The simulations use the transition probabilities to estimate how users probabilistically traverse the site. The Markov model assumes that the next page a user visits depends only on the current page. The previously mentioned assumption engenders tractable modeling of navigation behavior. In an example implementation, the steady-state probability is computed through iterative simulation rather than eigenvalue decomposition. N independent random walks may be selected, with M maximum transitions per walk. Each walk may initiate at a starting position and transition according to the page transition matrix until reaching a terminal state or step limit. Visit counts per page may be accumulated across all simulations. For each page category, the steady-state probability may be obtained. Terminal states (conv) and (no_conv) of the page transition matrix may be considered to be absorbing, with zero outbound transitions Item 410 shows the output of the Markov simulations in the form of steady-state probabilities. The steady-state probabilities reflect the long-term likelihood of a user being on a particular page category, assuming continued navigation. The steady-state distribution captures the equilibrium behavior of users across the site, and is used for computing entropy.

Transitioning to the operational phase, Item 412 converts actual page visits into page pairs and applies the calibrated Markov probabilities to the page pairs. The step(s) of Item 412 align real user behavior with the probabilistic model, enabling the system to assess how typical or atypical a user's navigation pattern is.

Item 414 represents the final computation of page entropy, which quantifies the unpredictability or disorder in a user's navigation sequence. Higher entropy indicates more exploratory or erratic behavior, while lower entropy suggests focused or goal-directed navigation. The page entropy is used downstream in the intent segmentation model to refine visitor classification. In an example implementation, for a user visiting pages {p1, p2, . . . pn}, steady-state scores of the visited pages may be retrieved and the aggregate page entropy may be calculated, with a total engagement weight factor. The entropy score may quantify user engagement depth by weighting page visits according to their probabilistic importance in conversion paths, enabling differentiation between users who visit high-conversion-probability pages versus low-value pages.

Blocks 416 and 418 show the formula by which interaction velocity of a visitor is calculated. Block 416 is the same as Equation (3) as described herein. The inputs to Block 416 may be derived from the raw clickstream data. Block 418 shows the resulting interaction velocity.

Figure 5:
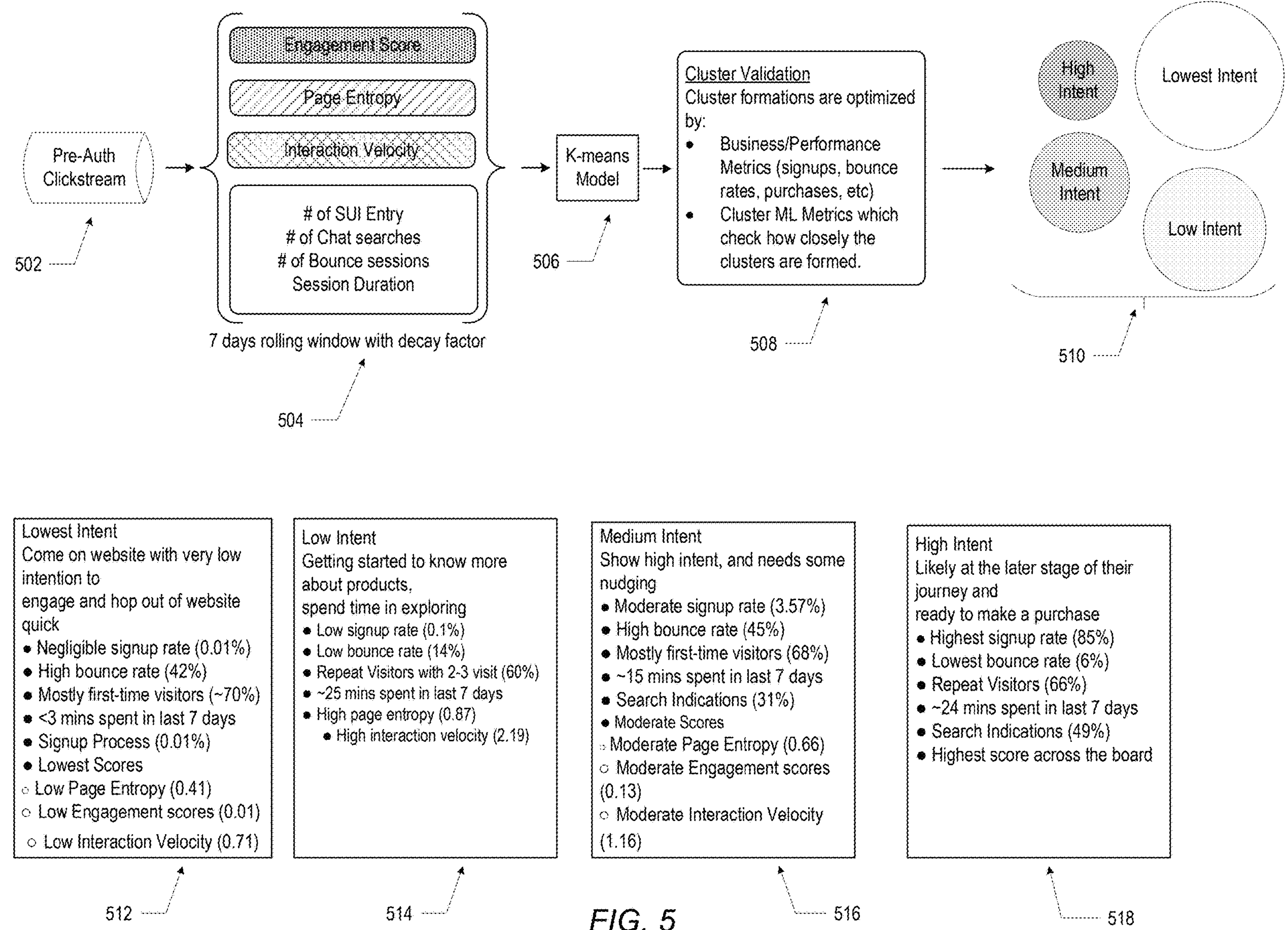

FIG. 5 shows an example implementation of the operation of the intent segmentation model, in accordance with one or more embodiments. The following example is for explanatory purposes only and not intended to limit the scope of one or more embodiments.

In FIG. 5, the operation of the intent segmentation model is organized into two phases: the clustering model operation (Items 502-506) and the validation and intent category assignment logic (Items 508-518). FIG. 5 builds upon the behavioral metrics derived from the engagement and entropy models described in FIGS. 3 and 4.

Item 502 shows the input source labeled "Pre-Auth Clickstream," which contains raw behavioral data collected from unauthenticated user sessions. The raw behavioral data includes granular interaction events such as page visits, session durations, bounce patterns, and search activities. The raw behavioral data serves as the foundational input for deriving behavioral metrics.

Item 504 shows the aggregation of a feature vector for each visitor, derived from two distinct sources of computation. Measures such as structured user interface (SUI) entries, chat searches, bounce sessions, and session durations are extracted directly from the raw pre-auth clickstream data using statistical computations. These metrics may be calculated using methods such as counting, averaging, and time-based aggregation. Separately, behavioral scores including engagement score, page entropy, and interaction velocity are obtained through semantic and mathematical interpretation using the engagement model (FIG. 3), the entropy model (FIG. 4), and the interaction velocity calculator (FIG. 4). The behavioral scores, engagement score, page entropy and interaction velocity together form a comprehensive feature vector that characterizes each visitor's behavior over a rolling 7-day window. The comprehensive feature vector is passed to the clustering model in Block 506.

Item 506 shows the clustering operation using a k-means model configured to generate four clusters. Visitors are grouped based on the similarity of their feature vectors, resulting in distinct behavioral cohorts. Each cluster remains unlabeled until further validation.

Item 508 shows the cluster validation phase, where business logic metrics and machine learning (ML) metrics are applied to assess the quality and relevance of each cluster. Business metrics include conversion rates, bounce rates, and product interactions, while ML metrics evaluate intra-cluster cohesion and inter-cluster separation. The dual-layer validation ensures that the clusters are both statistically robust and aligned with business objectives. In an example implementation, each cluster may be profiled using volume metrics such as count of sessions per cluster, and conversion rates. Other metrics may include visitor behavior such as proportion of returning visitors, proportion of first-time visitors, percentage of users with bounce sessions, percentage of users initiating SUI flow, and percentage of users engaging with chat/search. Engagement metrics may include an average page with event sequence probability, mean session duration and median session time.

Item 510 shows the assignment of intent categories to the validated clusters. Each cluster is mapped to one of four intent categories: Lowest Intent, Low Intent, Medium Intent, and High Intent. The intent categories reflect increasing levels of user engagement and conversion likelihood, and are determined based on the behavioral characteristics and performance metrics associated with each cluster.

Items 512-518 show examples of characteristics of clusters and the contribution of the characteristics in assigning the final intent category.

Item 512 shows the Lowest Intent cluster. Visitors in this group may arrive at the website with minimal intention to engage and tend to exit quickly. They may exhibit a negligible signup rate (0.01%), a high bounce rate (42%), and are predominantly first-time visitors (~70%). The time spent on the site by the visitors of this cluster is less than three minutes over the past seven days, and their signup process completion rate is similarly low (0.01%). The visitors of the lowest intent cluster register the lowest scores across all behavioral metrics: page entropy (0.41), engagement score (0.01), and interaction velocity (0.71), indicating disinterest and minimal interaction depth.

Item 514 shows the Low Intent cluster, which includes visitors who are beginning to explore but remain largely uncommitted. The visitors of the low intent cluster have a low signup rate of 1.49%, a moderate bounce rate of 31%, and a repeat visit rate of 60.9%. Their time spent on site is under five minutes over the past week, with a high page entropy score (0.87) and elevated interaction velocity (2.19), indicating exploratory but unfocused behavior.

Item 516 shows the Medium Intent cluster, where visitors show moderate interest and may be receptive to targeted engagement. The visitors of the medium intent cluster have a signup rate ranging from 35% to 79%, a high bounce rate of 45%, and increased interaction velocity (8.9%). Their time spent on site approaches 15 minutes, suggesting deeper exploration and potential conversion readiness.

Item 518 shows the High Intent cluster, which includes visitors who are likely in the final stages of their decision-making journey. These visitors exhibit high engagement scores, low bounce rates, frequent product page visits, and extended session durations. Their behavioral metrics reflect focused and purposeful navigation, making them prime candidates for conversion.

The system described herein operates in real time and is capable of dynamically updating intent classifications as visitor behavior evolves. The system facilitates downstream personalization, experimentation, and marketing interventions tailored to the inferred intent stage of each visitor. The system advantageously uses unsupervised learning to uncover latent behavioral patterns. By providing a scalable and interpretable framework for understanding and influencing the behavior of anonymous visitors, the invention improves engagement, reduces abandonment, and increases conversion rates of anonymous visitors to a client application.

One or more embodiments may be implemented on a computing system specifically designed to achieve an improved technological result. When implemented in a computing system, the features and elements of the disclosure provide a significant technological advancement over computing systems that do not implement the features and elements of the disclosure. Any combination of mobile, desktop, server, router, switch, embedded device, or other types of hardware may be improved by including the features and elements described in the disclosure.

Figures 6A, 6B:
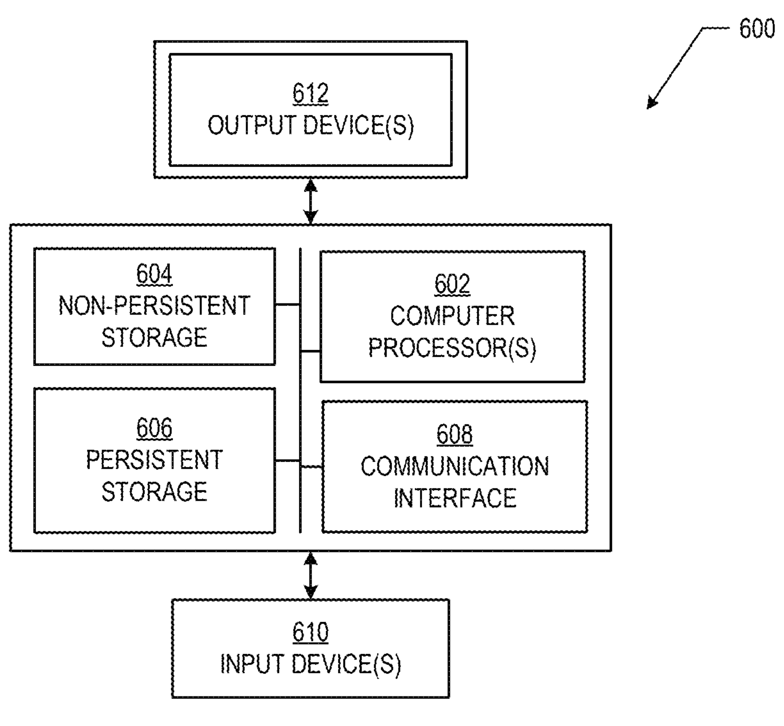
FIGS. 6A and 6B show an example of a computing system, in accordance with one or more embodiments.

For example, as shown in FIG. 6A, the computing system (600) may include one or more computer processor(s) (602), non-persistent storage device(s) (604), persistent storage device(s) (606), a communication interface (608) (e.g., Bluetooth interface, infrared interface, network interface, optical interface, etc.), and numerous other elements and functionalities that implement the features and elements of the disclosure. The computer processor(s) (602) may be an integrated circuit for processing instructions. The computer processor(s) (602) may be one or more cores, or micro-cores, of a processor. The computer processor(s) (602) includes one or more processors. The computer processor(s) (602) may include a central processing unit (CPU), a graphics processing unit (GPU), a tensor processing unit (TPU), combinations thereof, etc.

The input device(s) (610) may include a touchscreen, keyboard, mouse, microphone, touchpad, electronic pen, or any other type of input device. The input device(s) (610) may receive inputs from a user that are responsive to data and messages presented by the output device(s) (612). The inputs may include text input, audio input, video input, etc., which may be processed and transmitted by the computing system (600) in accordance with one or more embodiments. The communication interface (608) may include an integrated circuit for connecting the computing system (600) to a network (not shown) (e.g., a local area network (LAN), a wide area network (WAN) such as the Internet, mobile network, or any other type of network) or to another device, such as another computing device, and combinations thereof.

Further, the output device(s) (612) may include a display device, a printer, external storage, or any other output device. One or more of the output device(s) (612) may be the same or different from the input device(s) (610). The input device(s) (610) and output device(s) (612) may be locally or remotely connected to the computer processor(s) (602). Many different types of computing systems exist, and the aforementioned input device(s) (610) and output device(s) (612) may take other forms. The output device(s) (612) may display data and messages that are transmitted and received by the computing system (600). The data and messages may include text, audio, video, etc., and include the data and messages described above in the other figures of the disclosure.

Software instructions in the form of computer readable program code to perform embodiments may be stored, in whole or in part, temporarily or permanently, on a non-transitory computer readable medium such as a solid state drive (SSD), compact disk (CD), digital video disk (DVD), storage device, a diskette, a tape, flash memory, physical memory, or any other computer readable storage medium. Specifically, the software instructions may correspond to computer readable program code that, when executed by the computer processor(s) (602), is configured to perform one or more embodiments, which may include transmitting, receiving, presenting, and displaying data and messages described in the other figures of the disclosure.

The computing system (600) in FIG. 6A may be connected to, or be a part of, a network. For example, as shown in FIG. 6B, the network (620) may include multiple nodes (e.g., node X (622) and node Y (624), as well as extant intervening nodes between node X (622) and node Y (624)). Each node may correspond to a computing system, such as the computing system shown in FIG. 6A, or a group of nodes combined may correspond to the computing system shown in FIG. 6A. By way of an example, embodiments may be implemented on a node of a distributed system that is connected to other nodes. By way of another example, embodiments may be implemented on a distributed computing system having multiple nodes, where each portion may be located on a different node within the distributed computing system. Further, one or more elements of the aforementioned computing system (600) may be located at a remote location and connected to the other elements over a network.

The nodes (e.g., node X (622) and node Y (624)) in the network (620) may be configured to provide services for a client device (626). The services may include receiving requests and transmitting responses to the client device (626). For example, the nodes may be part of a cloud computing system. The client device (626) may be a computing system, such as the computing system shown in FIG. 6A. Further, the client device (626) may include or perform all or a portion of one or more embodiments.

The computing system of FIG. 6A may include functionality to present data (including raw data, processed data, and combinations thereof) such as results of comparisons and other processing. For example, presenting data may be accomplished through various presenting methods. Specifically, data may be presented by being displayed in a user interface, transmitted to a different computing system, and stored. The user interface may include a graphical user interface (GUI) that displays information on a display device. The GUI may include various GUI widgets that organize what data is shown, as well as how data is presented to a user. Furthermore, the GUI may present data directly to the user, e.g., data presented as actual data values through text, or rendered by the computing device into a visual representation of the data, such as through visualizing a data model.

As used herein, the term "connected to" contemplates multiple meanings. A connection may be direct or indirect (e.g., through another component or network). A connection may be wired or wireless. A connection may be a temporary, permanent, or a semi-permanent communication channel between two entities.

The various descriptions of the figures may be combined and may include, or be included within, the features described in the other figures of the application. The various elements, systems, components, and steps shown in the figures may be omitted, repeated, combined, or altered as shown in the figures. Accordingly, the scope of the present disclosure should not be considered limited to the specific arrangements shown in the figures.

In the application, ordinal numbers (e.g., first, second, third, etc.) may be used as an adjective for an element (i.e., any noun in the application). The use of ordinal numbers is not to imply or create any particular ordering of the elements, nor to limit any element to being only a single element unless expressly disclosed, such as by the use of the terms "before," "after," "single," and other such terminology. Rather, ordinal numbers distinguish between the elements. By way of an example, a first element is distinct from a second element, and the first element may encompass more than one element and succeed (or precede) the second element in an ordering of elements.

Further, unless expressly stated otherwise, the conjunction "or" is an inclusive "or" and, as such, automatically includes the conjunction "and," unless expressly stated otherwise. Further, items joined by the conjunction "or" may include any combination of the items with any number of each item, unless expressly stated otherwise.

In the above description, numerous specific details are set forth in order to provide a more thorough understanding of the disclosure. However, it will be apparent to one of ordinary skill in the art that the technology may be practiced without these specific details. In other instances, well-known features have not been described in detail to avoid unnecessarily complicating the description. Further, other embodiments not explicitly described above can be devised which do not depart from the scope of the claims as disclosed herein. Accordingly, the scope should be limited only by the attached claims.

What is claimed is:

1. A method comprising:

retrieving raw clickstream data of a first plurality of visitors of a client application;

processing, by an engagement model, a plurality of session sequences obtained from the raw clickstream data, to obtain a plurality of engagement scores corresponding to the first plurality of visitors;

processing a plurality of page sequences obtained from the raw clickstream data by a first entropy model to obtain a plurality of page entropies corresponding to the first plurality of visitors;

processing, by an intent segmentation model, the plurality of feature vectors to obtain a predetermined number of clusters;

computing interaction velocities of the first plurality of visitors based on an interaction velocity function;

generating feature vectors for the first plurality of visitors, to obtain a plurality of feature vectors, each comprising at least an engagement score, a page entropy, and an interaction velocity;

processing, by an intent segmentation model, the plurality of feature vectors to obtain a predetermined number of clusters; and assigning each cluster of the predetermined number of clusters to a corresponding intent category;

configuring a multi-factor analytics engine by performing operations comprising:

training an engagement model of the multi-factor analytics engine to generate a revised engagement score using a session sequence of a second plurality of session sequences of a new visitor of the client application, calibrating a second entropy model of the multi-factor analytics engine to generate the new page entropy of a page sequence of the new visitor of the client application, and training a new intent segmentation model of the multi-factor analytics engine to generate a new predetermined number of clusters corresponding to intent categories from feature vectors of sessions of the new visitor of the client application;

deploying the multi-factor analytics engine.

2. The method of claim 1, further comprising:

assigning an intent category corresponding to a cluster of the predetermined number of clusters to a visitor of the first plurality of visitors, based on a feature vector corresponding to the visitor being included in the cluster, to obtain intent categories corresponding to the first plurality of visitors; and transmitting the first plurality of visitors and the intent categories to an analytics application.

3. The method of claim 1, further comprising training the engagement model by performing operations comprising:

generating, from the raw clickstream data, a session sequence corresponding to a visitor, wherein the session sequence comprises a plurality of tokens, each comprising one of a session tag, a page tag, and an event tag, to obtain the plurality of session sequences; and for the session sequence of the plurality of session sequences:

generating, using an embedding model, a plurality of token embeddings corresponding to the plurality of tokens.

4. The method of claim 3, wherein the operations further comprise:

for the session sequence of the plurality of session sequences:

processing the plurality of token embeddings by an encoder of the engagement model, to obtain a plurality of contextualized token embeddings, pooling the plurality of contextualized token embeddings into an output embedding, and processing, by a multi-layer perceptron (MLP) of the engagement model, the output embedding to obtain a predicted engagement score.

5. The method of claim 3, wherein the operations further comprise:

for the session sequence of the plurality of session sequences:

comparing a predicted engagement score to a binary conversion label using a binary cross entropy loss function to obtain a loss function value, computing a gradient of the loss function value with respect to the predicted engagement score, backpropagating the gradient through an MLP of the engagement model to update first weights of the MLP, and backpropagating the gradient through an encoder of the engagement model to update second weights of the encoder.

6. The method of claim 1, further comprising calibrating the first entropy model by performing operations comprising:

generating, from the raw clickstream data, a plurality of ordered page visit pairs, each comprising a first page and a second page, wherein the second page is visited from the first page, generating, using the plurality of ordered page visit pairs, a page transition matrix comprising probabilities of visits from the first page to the second page, and applying a Markov function to the page transition matrix to obtain a steady-state probability vector, comprising steady-state probabilities corresponding to pages of the page transition matrix.

7. The method of claim 1, wherein processing the plurality of page sequences by the first entropy model further comprises, for a page sequence of the plurality of page sequences:

assigning steady-state probabilities corresponding to pages in the page sequence from a steady-state probability vector of the entropy model to obtain page probabilities of pages in the page sequence, applying an entropy function to the page probabilities to obtain a page entropy value, and applying a decay factor to the page entropy value, to obtain a page entropy, to obtain the plurality of page entropies.

8. The method of claim 1, further comprising:

determining an optimal number of clusters for a clustering model of the intent segmentation model by performing operations comprising:

computing a plurality of clustering cost metrics for a plurality of candidate cluster counts, wherein each clustering cost metric of the plurality of clustering cost metrics comprises a within-cluster sum of squared distances, computing a difference between a first clustering cost metric corresponding to a first cluster count and a second clustering cost metric corresponding to a second cluster count, wherein the second cluster count is consecutive to the first cluster count; and responsive to the difference failing to satisfy a cost reduction threshold, selecting the first cluster count as an inflection point.

9. The method of claim 8, wherein the operations further comprise:

computing silhouette scores for the plurality of candidate cluster counts using a silhouette scoring function, and selecting the optimal number of clusters based on the inflection point and a candidate cluster count yielding a highest silhouette score.

10. The method of claim 1, further comprising training a clustering model of the intent segmentation model by performing operations comprising:

adding, to each feature vector of the plurality of feature vectors, at least one clickstream metric, comprising a signup interface (SUI) entry count, a chat count, a bounce session count, and a total session duration, configuring the clustering model to generate a predetermined optimal number of clusters, and processing, by the clustering model, the plurality of feature vectors to obtain the predetermined number of clusters.

11. A system, comprising:

at least one computer processor;

a multi-factor analytics engine, executing on the at least one computer processor, and configured for:

retrieving raw clickstream data of a first plurality of visitors of a client application, processing, by an engagement model of the multi-factor analytics engine, a plurality of session sequences obtained from the raw clickstream data, to obtain a plurality of engagement scores corresponding to the first plurality of visitors, processing, by a first entropy model of the multi-factor analytics engine, a plurality of page sequences obtained from the raw clickstream data to obtain a plurality of page entropies corresponding to the first plurality of visitors, computing interaction velocities of the first plurality of visitors based on an interaction velocity function, generating feature vectors for the first plurality of visitors, to obtain a plurality of feature vectors, each comprising at least an engagement score, a page entropy, and an interaction velocity, processing, by an intent segmentation model of the multi-factor analytics engine, the plurality of feature vectors to obtain a predetermined number of clusters, and assigning each cluster of the predetermined number of clusters to a corresponding intent category, wherein the multi-factor analytics engine is further configured for:

assigning an intent category corresponding to a cluster of the predetermined number of clusters to a new visitor, based on a feature vector corresponding to the new visitor being included in the cluster, to obtain intent categories corresponding to a second plurality of visitors, and transmitting the second plurality of visitors and the intent categories to an analytics application;

a training application, wherein the training application is configured for performing operations comprising:

generating, from the raw clickstream data, a session sequence corresponding to the new visitor, wherein the session sequence comprises a plurality of tokens, each comprising one of a session tag, a page tag, and an event tag, to obtain the plurality of session sequences, and generating, for the session sequence of the plurality of session sequences, using an embedding model, a plurality of token embeddings corresponding to the plurality of tokens.

12. The system of claim 11, wherein the engagement model is further configured for:

for the session sequence of the plurality of session sequences:

processing the plurality of token embeddings by an encoder of the engagement model, to obtain a plurality of contextualized token embeddings, pooling the plurality of contextualized token embeddings into an output embedding, and processing, by a multi-layer perceptron (MLP) of the engagement model, the output embedding to obtain a predicted engagement score.

13. The system of claim 11, wherein the training application is further configured for:

for the session sequence of the plurality of session sequences:

comparing a predicted engagement score to a binary conversion label using a binary cross entropy loss function to obtain a loss function value, computing a gradient of the loss function value with respect to the predicted engagement score, backpropagating the gradient through an MLP of the engagement model to update first weights of the MLP, and backpropagating the gradient through an encoder of the engagement model to update second weights of the encoder.

14. The system of claim 11, further comprising a training application, configured for calibrating the entropy model by performing operations comprising:

generating, from the raw clickstream data, a plurality of ordered page visit pairs, each comprising a first page and a second page, wherein the second page is visited from the first page, generating, using the plurality of ordered page visit pairs, a page transition matrix comprising probabilities of visits from the first page to the second page, and applying a Markov function to the page transition matrix to obtain a steady-state probability vector, comprising steady-state probabilities corresponding to pages of the page transition matrix.

15. The system of claim 11, wherein processing the plurality of page sequences by the entropy model further comprises:

for a page sequence of the plurality of page sequences, assigning steady-state probabilities corresponding to pages in the page sequence from a steady-state probability vector of the entropy model to obtain page probabilities of pages in the page sequence, applying an entropy function to the page probabilities to obtain a page entropy value, and applying a decay factor to the page entropy value, to obtain a page entropy, to obtain the plurality of page entropies.

16. The system of claim 11, further comprising a training application, configured for determining an optimal number of clusters for a clustering model of the intent segmentation model by performing operations comprising:

computing a plurality of clustering cost metrics for a plurality of candidate cluster counts, wherein each clustering cost metric of the plurality of clustering cost metrics comprises a within-cluster sum of squared distances, computing a difference between a first clustering cost metric corresponding to a first cluster count and a second clustering cost metric corresponding to a second cluster count, wherein the second cluster count is consecutive to the first cluster count, responsive to the difference failing to satisfy a cost reduction threshold, selecting the first cluster count as an inflection point, computing silhouette scores for the plurality of candidate cluster counts using a silhouette scoring function, and selecting the optimal number of clusters based on the inflection point and a candidate cluster count yielding a highest silhouette score.

17. The system of claim 11, further comprising a training application, configured for performing operations comprising:

adding, to each feature vector of the plurality of feature vectors, at least one clickstream metric, comprising an SUI entry count, a chat count, a bounce session count, and a session duration, configuring a clustering model of the intent segmentation model to generate a predetermined number of clusters, and processing, by the clustering model, the plurality of feature vectors to obtain the predetermined number of clusters.

18. The method of claim 1, further comprising:

receiving raw clickstream data of a second plurality of visitors of the client application;

processing, by the engagement model, a second plurality of session sequences obtained from the raw clickstream data, to obtain a plurality of engagement scores corresponding to the second plurality of visitors;

processing, by the second entropy model, a plurality of page sequences obtained from the raw clickstream data to obtain a plurality of page entropies corresponding to the second plurality of visitors;

computing interaction velocities per session of the second plurality of visitors based on an interaction velocity function of the multi-factor analytics engine;

generating the feature vectors per session for the second plurality of visitors, to obtain the plurality of feature vectors, each comprising at least the engagement score, the page entropy, and the interaction velocity;

processing, by the new intent segmentation model, the plurality of feature vectors to obtain the new predetermined number of clusters;

assigning each cluster of the new predetermined number of clusters to the corresponding intent category;

assigning the intent category corresponding to a cluster of the new predetermined number of clusters to the new visitor, based on feature vectors corresponding to the new visitor being included in the cluster, to obtain intent categories corresponding to the plurality of visitors; and transmitting the plurality of visitors and the corresponding intent categories to an analytics application.

* * * * *